(12) United States Patent
Smith et al.

(10) Patent No.: US 9,365,727 B2
(45) Date of Patent: Jun. 14, 2016

(54) PROCESS FOR THE COATING OF METALLIC COMPONENTS WITH AN AQUEOUS ORGANIC COMPOSITION

(75) Inventors: Noel Smith, Hackettstown, NJ (US); Heribert Domes, Weilmunster (DE)

(73) Assignee: CHEMETALL GMBH (DE)

( * ) Notice: Subject to any disclaimer, the term of this patent is extended or adjusted under 35 U.S.C. 154(b) by 0 days.

(21) Appl. No.: 13/413,845

(22) Filed: Mar. 7, 2012

(65) Prior Publication Data

US 2012/0171402 A1 Jul. 5, 2012

Related U.S. Application Data

(63) Continuation of application No. 11/106,032, filed on Apr. 14, 2005, now abandoned.

(51) Int. Cl.
*B05D 3/00* (2006.01)
*C09D 5/00* (2006.01)
*C09D 5/44* (2006.01)

(52) U.S. Cl.
CPC .............. *C09D 5/002* (2013.01); *C09D 5/4411* (2013.01); *Y10T 428/1355* (2015.01); *Y10T 428/24628* (2015.01); *Y10T 428/31699* (2015.04)

(58) Field of Classification Search
CPC ...... C09D 5/002; C09D 5/4411; C09D 5/086; C09D 5/084
USPC ......... 427/154, 156, 289, 402, 492, 493, 508, 427/553
See application file for complete search history.

(56) References Cited

U.S. PATENT DOCUMENTS

| | | | |
|---|---|---|---|
| 3,568,486 A * | 3/1971 | Rosenberg et al. | 72/42 |
| 3,755,119 A | 8/1973 | Pietsch | |
| 3,908,066 A * | 9/1975 | Parkinson | 428/379 |
| 4,030,945 A * | 6/1977 | Hall et al. | 428/462 |
| 4,148,670 A * | 4/1979 | Kelly | 148/247 |
| 5,283,276 A * | 2/1994 | Best et al. | 524/166 |
| 5,706,684 A * | 1/1998 | Gong et al. | 72/42 |
| 6,656,531 B2 * | 12/2003 | Yoshioka et al. | 427/386 |
| 6,875,479 B2 | 4/2005 | Jung et al. | |
| 2004/0009300 A1 * | 1/2004 | Shimakura et al. | 427/407.1 |
| 2004/0022950 A1 * | 2/2004 | Jung et al. | 427/385.5 |

FOREIGN PATENT DOCUMENTS

| | | |
|---|---|---|
| DE | 1 546 943 B1 | 1/1970 |
| GB | 1 264 428 A | 2/1972 |

* cited by examiner

*Primary Examiner* — Michael Wieczorek
(74) *Attorney, Agent, or Firm* — Jeremy J. Kliebert

(57) ABSTRACT

A process for the coating of surfaces of a metallic component to be formed by contacting the surfaces of the metallic component prior to forming operation with an aqueous composition containing 80% by weight of at least one organic film-forming ionomeric polymer or copolymer, whereby the total organic polymeric material has an average acid number in the range from 20 to 300, optionally at least one further organic film-forming polymer different from the organic film-forming ionomeric polymer or copolymer; optionally a neutralizing agent; a low temperature corrosion inhibiting cross-linking agent and water. The pH of the aqueous composition at the beginning of the coating process is in the range from 6 to 10.5.

5 Claims, No Drawings

PROCESS FOR THE COATING OF METALLIC COMPONENTS WITH AN AQUEOUS ORGANIC COMPOSITION

This application is a continuation of U.S. Ser. No. 11/106,032 filed Apr. 14, 2005 now abandoned, which is hereby incorporated by reference in its entirety for all purposes.

The invention relates to a process for the coating of a metallic component to be formed by at least one forming operation like cold-forming, cold-forging, roll-stamping, wire-drawing, deep-drawing or roll-forming by contacting the metallic component before the forming operation with an aqueous composition that contains predominantly organic polymeric material as well as to a method of the use of such coated components.

BACKGROUND OF THE INVENTION

Such aqueous compositions may be used to coat metallic components like coils, sheets, plates, foils, plastic laminated metal foils and other laminated components, parts of any shape or wires or any combination of these to generate organic coatings with a high flexibility and high resistance against corrosion. Such compositions may be used for the production e.g. of corrugated iron, gutters, profiles, tubings, automotive stampings, housings, electronic equipment or guard rails. Such components may further be used for inside or outside architectural use, aerospace industry, automotive industry, apparatuses, appliance industry, construction, roofing, siding, transport, ventilating, cylinders, fasteners, shafts, containers or tanks. Such compositions may be even used as so-called dry-lubes for the cold-forming of components like cylinders, fasteners, shafts, containers or tanks.

Many of the existing aqueous compositions used for such coatings and for the thereof resulting products are formulated for demanding coating conditions and specific coating properties. Because of specifically selected raw materials, such compositions are often expensive. Therefore, there was the need to look for alter-native raw material sources and alternative compositions that may lead to coated metallic components that may be well formed by any forming operation and that render a sufficient corrosion resistance as well as paint adhesion if the coated components would be painted afterwards.

SUMMARY OF THE INVENTION

It was an object of the present invention to form thin organic corrosion protecting coatings at temperatures below 80° C. PMT (peak-metal-temperature). It was a further object to propose compositions and coatings to be used with chromium compounds or in alternative without chromium compounds. It was further an object of the present invention to lower the costs of the raw materials selected to be used for the aqueous composition as well as the costs of the process.

It has been found that if a significant content of a wax dispersion was added to the aqueous organic composition, there typically occurred trouble as this addition affected the stability of the aqueous composition as well as the properties of the coatings generated therewith like the corrosion resistance. Such aqueous compositions containing a content of a wax gelled or were often jelly or become soon jelly. It has further on been found that there is no need of adding any wax as the forming properties of the coatings of the invention are as sufficient that there is no need to add any wax to the aqueous composition as the coatings generated are sufficient flexible and lubricious not to be affected during the forming of the metallic component and allow a forming operation without an increase of forces and of wear.

The object is achieved by a process for the coating of surfaces of a metallic component to be formed by at least one forming operation like cold-forming, cold-forging, roll-stamping, roll-forming, deep-drawing or wire-drawing by contacting the surfaces of the metallic component before the forming operation with an aqueous composition that contains predominantly organic polymeric material whereby the aqueous composition contains at least one compound each of:

A) organic film-forming polymeric material(s) selected from the group consisting of ionomeric copolymers, copolymers chemically related to ionomeric copolymers showing nearly or totally the properties of ionomeric copolymers and their corresponding monomers, comonomers, oligomers, cooligomers, polymers, blockcopolymers as well as their esters, salts and derivates, which all together are constituents of at least 70% by weight of the total organic polymeric material and whereby the total organic polymeric material has an average acid number in the range from 20 to 300, A') optionally at least one further organic film-forming polymer or their corresponding monomer(s), oligomer(s), copolymer(s), blockcopolymer(s), their derivates or any combination of them that do not belong to A) participating in the rest of the total organic polymeric material to 100% by weight, B) optionally neutralizing agent(s), C) low temperature corrosion inhibiting cross-linking agent(s) and D) water, whereby the pH of the aqueous composition is at the beginning of the coating process in the range from 6 to 10.5, often in the range from 7 to 10.

Preferably, the organic film-forming polymeric materials A) and optionally at least one further organic film-forming polymer A') have a certain amount or high amount of carboxyl groups. A certain amount of carboxyl groups in the aqueous composition as used for the coating is helpful for the reaction with the metallic surface. Optionally, the percentage of copolymers in the total organic polymeric material is in the range from 75 to 100 percent by weight.

According to the invention, there may be prepared a dispersion containing at least one organic film-forming polymeric material A) as starting composition for the aqueous composition or there may be taken at least one dispersion containing at least one organic film-forming polymeric material A) as one of the raw materials added to the aqueous composition of the invention.

There must not be present any neutralizing agent B) in the aqueous composition according to the invention. As neutralizing agents, ammonium hydroxide, amine-based compounds like a trialkyl amine as well as potassium hydroxide if only used in smaller amount are preferred. The ammonium hydroxide and some of the amine-based compounds will more or less evaporate. The at least one neutralizing agent shall help to generate an aqueous dispersion of the copolymeric material(s) by solubilization. If sodium or higher amounts of potassium compounds would be added, this may cause in many cases a water-sensitive organic coating which is not preferred. The term "dispersion" shall include solutions. In many cases, the at least one neutralizing agent helps to neutralize the often more or less acidic copolymeric materials that will be dissolved or dispersed or both in water or in the aqueous composition if the organic film-forming polymeric materials A) and optionally at least one further organic film-forming polymer A') are heated in water in the presence of at least one neutralizing agent. Such dispersion will have in many cases a low viscosity if the carboxyl groups of the copolymeric material(s) are only partially neutralized, preferably neutralized to 20 to 85%, more preferred to 30 to 80%, most preferred to 40 to 70%, especially to 50 to 60%. Such only partially neutralized dispersions are often of low viscosity whereas the viscosity may increase with the degree of neutralization, sometimes even up to a paste-like material. By the heating in the presence of water and of at least one neutralizing agent, an ion containing copolymeric material is produced. Typically, the ions contained in the copolymeric material are bound and ionize carboxyl groups. Therefore, the bound ions are no longer able to ionize compounds present in water. If the aqueous dispersion gets in contact with a metallic surface, the ions coming out of the metallic materials of the surface may be bound in the ionomeric polymeric material, too. By such heating and neutralizing, a dispersion of low viscosity may be prepared. There may be a further content of neutralizing agent(s) in the dispersion as this reaction and dispersing takes primarily or only place during the heating. If such a dispersion is added to the aqueous composition, then there is no need to add any neutralizing agent.

Preferably, at least one neutralizing agent is evaporating from the wet film of the aqueous composition on the metallic surface or is chemically reacted in any way generating a pH in the range from 4 to 10 in the drying film or both. Preferably, at least a part of the ionomeric copolymeric materials or of the copolymeric materials related to ionomeric copolymeric materials or of any combination of these have carboxyl groups which may be used in such chemical reaction. This reaction may help to solubilize and dispers the copolymeric material(s). This chemical reaction may occur with the help of at least one alkaline compound, of at least one acidic catalyst, sometimes even with the help of another constituent or with the help of any combination of these. Further on, there may be added several constituents like agents for specific tasks as well as at least one organic solvent.

Preferably, a dry film (the "coating") is generated which enables the film-formation and the solidification by drying at a temperature significantly below 100° C. or at a temperature slightly above room temperature or even at room temperature or at any combination of these temperature ranges.

The aqueous compositions according to the invention are preferably free of any wax and of any oil. A wax according to the invention shall mean a compound that has a defined melting point, that has a relatively low viscosity if it is molten and that is able to occur in a crystalline form. Typically, a wax does not show a significant or even any content of carboxyl groups, is hydrophobe and is to a high extent chemically inert.

Preferably, there is no addition or no intentional addition or no essential addition of any surfactant, of any heavy metal like cadmium, cobalt, copper, molybdenum, nickel, tin or tungsten or any combination of these, especially to avoid poisonous substances like heavy metals and to avoid environmentally unfriendly compounds like phosphate based surfactants or chlorinated compounds as far as possible or to avoid disturbing compounds like surfactants. Nevertheless, there exists the old problem to be forced to use chromium compounds in many applications because of their excellent corrosion protection behavior. In some cases it is more preferred that the amount of such compounds is reduced to a minimum or near to such minimum if it would be necessary or advisable to add any such component(s) at all. The addition of surfactants seems in many cases not to be necessary as there is a good wetting behavior of the organic polymeric material especially if this has a higher acid number.

According to another feature of the invention, there is a coating generated with the process according to the invention.

According to a further feature of the invention, there is a coated metallic component that is coated by a process according to the invention.

According to a further feature of the invention, there is a method of use of the coated metallic component according to the invention.

DETAILED DESCRIPTION OF THE INVENTION

The metallic component coated may be of any metallic material like steel, cold rolled steel, hot rolled steel, stainless steel, zinc, a zinc alloy, aluminum, aluminum alloy, magnesium alloy, titanium, titanium alloy, copper, any copper alloy like brass and bronze, tin and any tin alloy like a tin lead alloy. The metallic component coated may be of any metallic material and may be of any shape.

The metallic component may be precoated with a metallic coating e.g. of zinc, a zinc alloy, a nickel alloy, a cobalt alloy, a silicon alloy, a tin alloy, copper, a copper alloy, an aluminum alloy, an aluminum and zinc containing alloy like Galfan®, like Galvaneal® or like Galvalume®.

The surface of the metallic component may be anodized, especially if it contains aluminum, magnesium, titanium or any combination of these.

The surface of the metallic component may be precoated, especially with at least one layer e.g. of a pretreatment composition like any phosphate coating, any chromate coating, any coating containing titanium, zirconium, silane/silanol/siloxane/polysiloxane or any combination of these or any other layer rendering the metallic surface corrosion resistance or paint adhesion or both. This at least one layer may be a very thin layer like a monolayer of any substance like a surfactant, but it has to be taken care that a contamination with any surfactant does not affect the coating with the aqueous coating composition according to the invention.

The aqueous composition may preferably consist essentially of the constituents A) and C) as well as optionally of at least one of the constituents selected from the group consisting of constituents A'), B) and a) to j). Nevertheless, there may then be further a small amount of at least one further compound or type of ion or both here to be seen as "non-essential" like impurities e.g. coming from raw materials, compounds or ions or both that were introduced into the aqueous composition e.g. by pickling or by any alkaline effect e.g. with the tubes and bath container walls, not intentionally added compounds that have been dragged in e.g. from another bath or any combination of these.

The term "comonomers, monomers, oligomers, cooligomers, polymers, copolymers, blockcopolymers as well as their esters, salts and derivates" shall include all kinds of preoligomers, precooligomers, prepolymers, precopolymers and preblockcopolymers. The term "polymeric" or "copolymeric" or both terms together shall indicate in a broad sense that there may be present monomers, comonomers, oligomers, cooligomers, polymers, copolymers, blockcopolymers as well as their esters, salts and derivates. Such terms comprise terpolymers and graft polymers, too. The term "crosslinking" shall include the densification of the coating to form a homogeneous film by film-forming, in some of the embodiments with the aid of a film-forming agent e).

Ionomeric polymeric materials are typically organic polymeric materials with ionic sites that have been reacted at least partially with counterions or that will be reacted at least partially with during the crosslinking e.g. of the wet film and perhaps even later in the dry film ("the coating"). The ionomeric polymeric materials may contain as raw materials, as cross-linked organic materials or both nonionic repeat units and often a mostly small amount of ion containing repeat units. Often, the ionic groups will mostly be less than 30% or even less than 15% by weight of the ionomeric polymeric material(s). The ionomeric polymeric materials differ clearly from waxes.

The ionomeric organic film-forming copolymer(s) as constituent A) to be added to the aqueous composition are preferably selected from the group of materials containing predominantly ethylene/propylene acrylic acid copolymers, ethylene/propylene methacrylic acid copolymers, ethylene/propylene maleic anhydride copolymers or ethylene/propylene naphthalic anhydride copolymers or any combination of these. They may even contain as constituent A) to be added to the aqueous composition preferably polymeric materials on the base of styrene, butadiene, urethane, fumaric acid, sulfonic acid or any combination of these or of any of these in any combination with the polymeric materials just mentioned before. They may contain a minor content or traces each of at least one compound selected from the group consisting of their corresponding monomers, comonomers, oligomers, cooligomers, polymers, blockcopolymers as well as their corresponding esters, salts and derivates. In the following, the term "ethylene/propylene" shall mean that either ethylene or propylene or both may be present.

The ionomeric or the nearly ionomeric organic film-forming copolymeric material(s) or both as constituent(s) A) to be added to or contained in the aqueous composition are more preferred selected from the group consisting of ethylene/propylene acrylic acid copolymers, ethylene/propylene methacrylic acid copolymers, ethylene/propylene maleic anhydride copolymers, ethylene/propylene naphthalic anhydride copolymers, their corresponding monomers, comonomers, oligomers, cooligomers, polymers, blockcopolymers as well as their corresponding esters, salts and derivates as well as any combination of these. These organic film-forming copolymer(s) preferably have at least partially any groups e.g. like acrylate, butyl, ethyl, isobutyl, methyl, propyl and vinyl. Especially the copolymers, esters, salts and some of the derivates may in some embodiments contain a content of ammonium, sodium, potassium, calcium, magnesium, aluminum, iron, manganese, titanium, zinc, zirconium or any combination of these. But in some cases, there may be used at least one other cation alone or together with at least one of the cations just mentioned before. The cations may preferably be added during the neutralization of the polymeric material.

In this status, the neutralized ionomeric or nearly ionomeric copolymeric materials are typically thermoplastics that have ionic cross-links and that may be called reversible cross-linkers, but they are not yet cross-linked polymeric materials. On heating, the ionic groups may loose their attractions and some chains may freely move around. Then, these polymeric materials will often show the properties of elastomers and the processability of thermoplastics.

Many ionomeric or nearly ionomeric copolymeric materials have a content of acrylic acid or methacrylic acid or both in a total range from 5 to 30% by weight, often in a total range from 10 to 28% by weight. Many ionomeric or nearly ionomeric copolymeric materials have a content of ethylene/propylene acrylic acid, ethylene/propylene methacrylic acid or both in a total range from 60 to 95% by weight, often in a total range from 72 to 90% by weight. In many cases, there will be a content in the range from 0.1 to 10% by weight selected from the group consisting of monomers, comonomers, oligomers, cooligomers, polymers, blockcopolymers as well as their corresponding esters, salts and derivates or in the range from 0.1 to 10% by weight of further constituents as often added to such dispersions—not calculating water and organic solvent—or any combination of these. Often, such copolymeric materials show a low crystallinity and are bondable, paintable, clear, water vapor permeable and tough. In many embodiments, the content of ionomeric comonomers and monomers together as parts of the constituent A) is less than 25% by weight, often less than 15% or even less than 5% by weight, typically less than 1%. Often, the film forming temperature of the aqueous composition is at least 1° C., preferably of at least 20° C., in several cases of at least 40° C.

The blockcopolymers and copolymers of ionomeric or nearly ionomeric copolymeric materials may further contain e.g. butyl groups, acrylate, neopentyl, ethylene oxide, propylene oxide, vinyl groups, dimethyl, acrylamide, lactide, naphthalene, styrene as well as other specific organic segments and groups. Such blockcopolymers may be based e.g. on acrylic acid—acrylic acid, acrylic acid—methacrylic acid and methacrylic acid—methacrylic acid and optionally on other organic groups and substances.

Preferably, the ionomeric polymeric materials to be used with the process of the invention have a melting point in the range from 30 to 300° C. measured according to ASTM D3418, more preferred in the range from 50 to 120° C., most preferred in the range from 65 to 90° C.

Preferably, the ionomeric or nearly ionomeric copolymeric materials to be used with the process of the invention have a glass transition temperature $T_g$ in the range from −30 to 60° C. measured according to ASTM D3418, more preferred in the range from −15 to 30° C., most preferred in the range from −10 to 20° C.

Preferably, the ionomeric or nearly ionomeric copolymeric materials to be used with the process of the invention have a molecular weight in the range from 2000 to 100000, more preferred in the range from 4000 to 50000, most preferred in the range from 5500 to 13000.

By using such ionomeric or nearly ionomeric organic compounds as constituent A), there is a wax-like behavior of the coatings achieved.

Preferably, the percentage of copolymers in the organic film-forming polymeric material(s) A) is in the range from 85 to 100 percent by weight, more preferred in the range from 90 to 99.5 percent by weight, most preferred in the range from 92 to 99 percent by weight.

Preferably the percentage of copolymers in the total organic polymeric material is in many embodiments in the range from 60 to 100 percent by weight, more preferred in the range from 80 to 100 percent by weight, most preferred in the range from 90 to 100 percent by weight, especially in the range from 92 to 99 percent by weight, e.g. at about 94, 96 or 98 percent by weight.

In many embodiments according to the invention, there is added at least one dispersion to the aqueous composition going to be composed containing at least a portion or the whole portion of the organic film-forming polymeric material A) to be added. Such dispersion may contain besides of the at least one copolymer minor contents or traces of at least one compound selected from the group consisting of monomers, comonomers, oligomers, cooligomers, polymers, blockcopolymers as well as their esters, salts and derivates corresponding to the ionomeric copolymers or to the copolymers chemically related to ionomeric copolymers ("the nearly ionomeric copolymeric materials") showing nearly or totally the properties of ionomeric copolymers or to both. Such dispersions may contain as solid materials predominantly at least one compound selected from the group consisting of ionomeric copolymers and copolymers chemically related to ionomeric copolymers showing nearly or totally the properties of ionomeric copolymers, preferably at least 90% by weight or at least 95% by weight of the solid materials of such dispersions. Such dispersions may contain a content of at least one type of cations selected from the group consisting of ammonium, sodium, potassium, calcium, magnesium, aluminum, iron, manganese, zinc and any combination of these. The further constituents of such dispersions are to be seen as constituents of the organic copolymeric material(s) A).

Such dispersions may in many cases be anionically or non-ionically stabilized or anionically and non-ionically stabilized or any mixture of these. Such acidic dispersions which have a significant amount of carboxyl groups may then be neutralized to a pH of at least 6 or of at least 7. Such dispersions may in many cases show a small content of at least one alkaline compound like sodium hydroxide or ammonium hydroxide respectively their corresponding ions or of at least one acid respectively their corresponding ions or any combination of these. Such dispersions may in many cases show a pH in the range from 6 to 10.5, more preferred in the range from 7 to 10, most preferred in the range from 7.5 to 9.5. If the pH would be too high, the polymer might be chemically attacked or destroyed.

According to one of the definitions existing for ionomeric organic copolymeric materials, such materials have a content especially of sodium, potassium, calcium, magnesium, zinc or any combination of these, but not predominantly of ammonium. According to another definition, even ammonium ions may contribute to the generation of an ionomeric copolymeric material. If there are predominantly or only cations of ammonium added, these copolymers should not be called ionomeric copolymers, but maybe one type of nearly ionomeric copolymeric materials. Nevertheless, if copolymeric materials containing predominantly or only cations of ammonium are to be added to the aqueous composition according to the invention, the copolymeric materials in the aqueous composition and in the resulting coating will often behave or nearly behave like typical ionomeric copolymeric materials. The addition of at least one dispersion containing at least one copolymer to the aqueous composition is preferred as such addition may help to homogeneously dispers the copolymeric material in the aqueous composition and in the coating.

The total organic polymeric material or the copolymeric material(s) A) or both have preferably an average acid number in the range from 50 to 250, more preferred in the range from 100 to 225 and most preferred in the range from 140 to 200, especially at about 130, at about 150, at about 160, at about 170, at about 180 at about 190 or at about 210 or in any ranges in between any of these data. The ionomeric or nearly ionomeric copolymeric material often has a relatively high acid number compared with most of the known organic materials of dispersions based on e.g. acrylic polymeric materials. It has been found that a significantly better cross-linking degree may be reached with the copolymeric materials of this invention than with most other organic polymeric materials if no high temperature cross-linking agent and no photoinitiator is used, probably often a cross-linking degree in the range from 50 to 99% or more often of 60 to 95%—as far as up to now known—whereas the cross-linking degree of other organic polymeric materials is often in the range from 20 to 60% if there is a film-forming process without any high temperature cross-linkers used. There may be even a slow further cross-linking of longer time with any low temperature cross-linker.

If there would be any addition of at least one low temperature or high temperature cross-linker like compounds based on isocyanate, isocyanurate or melamine or any blocked cross-linkers or any combination of such cross-linkers, there may be a significantly higher chemical resistance and mechanical resistance of the coating whereby the flexibility may be lowered and often even the corrosion protection is not further improved. Especially, if there is a content of an organic polymeric material A') having a certain amount of e.g. hydroxyl groups like any acrylics may be used together with such cross-linkers to enhance the properties of the polymeric coating. Such cross-linkers may be selected according to the temperature from which the cross-linking shall be started. Such agent may be effective starting at a temperature in a range of about 15 to about 240° C. If there is a coating that has been generated with an aqueous composition showing a content of at least one photoinitiator or at least one other type of cross-linker or of both, there is a possibility to have a coating that is formed with any forming operation being only or predominantly cross-linked with the low temperature corrosion inhibiting cross-linking agent(s) C). The aqueous composition containing at least one other type of cross-linker may preferably be further cross-linked starting at low temperature or at high temperature or both and being then further cross-linked, optionally even over short or long term further on after the heating. During the forming operation or afterwards or both, at its forming temperature, the forming coating or the formed coating may preferably be heated up or may be heated up to at least the starting temperature of the cross-linking of the chemical cross-linker(s), e.g. by temperhardening or by any other heating operation. Preferably, the coating containing at least one other type of cross-linker is further cross-linked starting with a temperhardening or with another kind of heating. Alternatively, there may be at any time an actinic irradiation that causes the start of the actinic cross-linking e.g. by UV irradiation. Preferably, the aqueous composition containing at least one photoinitiator and actinically cross-linkable monomers may be further cross-linked starting by actinic irradiation. There may be even a combination of a chemical and an actinic cross-linking, especially after the forming operation. Further on, there is a possibility to use any compound e.g. based on isocyanate as a low temperature cross-linker but typically this is no corrosion inhibiting cross-linking agent which is used, too, as a cross-linking agent. There may be even an actinic cross-linking if there is added at least one photoinitiator together with an amount of monomers to be cross-linked in this way to the aqueous composition. By using not only the low temperature corrosion inhibiting cross-linking agent(s) C) for the cross-linking, but even at least one photoinitiator or at least one other type of cross-linker or both, there may be a significant higher cross-linking degree and a significant improvement of the coating properties.

The percentage of copolymers in the total organic polymeric material is preferably in the range from 2 to 35 percent by weight, more preferred in the range from 5 to 30 percent by weight and most preferred in the range from 12 to 25 percent by weight, especially at about 10, at about 12, at about 14, at about 16, at about 18, at about 20, at about 22, at about 24, at about 26 or at about 28 percent by weight or in any ranges in between any of these data.

The relation of the total organic polymeric material to the total solids' content may be varied in broad ranges. Preferably, this relation is in the range from 75 to 99%, more preferred in the range from 85 to 98%, in the range from 90 to 97%.

The content of total organic polymeric material A) plus A') in the aqueous composition may preferably be varied in the range from 40 to 440 g/L calculated as the active compounds, more preferred in the range from 70 to 400 g/L, much more preferred in the range from 100 to 370 g/L, most preferred in the range from 95 to 340 g/L especially in the range from 110 to 310 g/L, especially of about 100 g/L, of about 120 g/L, of about 130 g/L, of about 140 g/L, of about 150 g/L, of about 160 g/L, of about 170 g/L, of about 180 g/L, of about 190 g/L, of about 200 g/L, of about 210 g/L, of about 220 g/L, of about 230 g/L, of about 240 g/L, of about 250 g/L, of about 260 g/L, of about 270 g/L, of about 280 g/L, of about 290 g/L or of about 300 g/L or in any ranges in between any of these data.

The content of the film-forming organic ionomeric or nearly ionomeric copolymer(s) A) in the aqueous composition may preferably be varied in the range from 35 to 440 g/L calculated as the active compounds, more preferred in the range from 50 to 390 g/L, much more preferred in the range from 70 to 350 g/L, most preferred in the range from 80 to 310 g/L especially in the range from 90 to 270 g/L, especially of about 100 g/L, of about 120 g/L, of about 130 g/L, of about 140 g/L, of about 150 g/L, of about 160 g/L, of about 170 g/L, of about 180 g/L, of about 190 g/L, of about 200 g/L, of about 210 g/L, of about 220 g/L, of about 230 g/L, of about 240 g/L, of about 250 g/L, of about 260 g/L, of about 270 g/L, of about 280 g/L, of about 290g/L or of about 300 g/L or in any ranges in between any of these data.

The content of the at least one further film-forming organic polymer/co-polymer/blockcopolymer A') or their corresponding monomer(s)/oligomer(s) or any combination of these participating in the rest of the total organic polymeric material to 100% by weight in the aqueous composition may be zero or may preferably be varied in the range from 1 to 90 g/L calculated as the active compounds, more preferred in the range from 5 to 80 g/L, much more preferred in the range from 15 to 70 g/L, most preferred in the range from 30 to 60 g/L, especially of about 10 g/L, of about 20 g/L, of about 30 g/L, of about 40 g/L, of about 50 g/L, of about 60 g/L, of about 70 g/L or of about 80 g/L or in any ranges in between any of these data.

The content of the at least one further film-forming organic polymer/co-polymer/blockcopolymer A') or their corresponding monomer(s)/oligomer(s) or any combination of these participating in the rest of the total organic polymeric material to 100% by weight in the aqueous composition may be zero or may preferably be varied in the range from 0.01 to 30% by weight calculated as the active compounds, more preferred in the range from 0.1 to 28% by weight, much more preferred in the range from 1 to 26% by weight, most preferred in the range from 2 to 24% by weight, especially of about 3% by weight, of about 5% by weight, of about 7% by weight, of about 9% by weight, of about 11% by weight, of about 13% by weight, of about 15% by weight, of about 17% by weight, of about 19% by weight, of about 21% by weight or of about 23% by weight or in any ranges in between any of these data.

The total solids' content of the aqueous composition may preferably be varied in the range from 50 to 450 g/L, more preferred in the range from 70 to 400 g/L, much more preferred in the range from 90 to 350 g/L, most preferred in the range from 100 to 300 g/L, especially in the range from 150 to 270 g/L, especially of about 100 g/L, of about 120 g/L, of about 130 g/L, of about 140 g/L, of about 150 g/L, of about 160 g/L, of about 170 g/L, of about 180 g/L, of about 190 g/L, of about 200 g/L, of about 210 g/L, of about 220 g/L, of about 230 g/L, of about 240 g/L, of about 250 g/L, of about 260 g/L, of about 270 g/L, of about 280 g/L, of about 290g/L or of about 300 g/L or in any ranges in between any of these data. If there is a lower solids' content, then there may often be a higher viscosity used to achieve the same coating weights.

According to the process of the invention, the organic copolymeric material(s) A) or the total organic polymeric material or both may preferably show an average melt index measured according to ASTM D 1238 in the range from 5 to 2000 g/10 min. The melt index is a function of the molecular weight and the rheology of an organic compound especially like natural resins. The melt index of an ethylene acrylic acid may be in the range from 5 to 5000, often in the range from 15 to 1500, sometimes in the range from 100 to 800. Often, such melt index is used for a solvent based organic polymer system.

According to the process of the invention, the aqueous composition or the organic ionomeric or nearly ionomeric copolymeric material(s) for the aqueous composition or any combination of these may preferably be prepared by heating up an aqueous copolymeric base composition containing at least one of the organic copolymers having an acid number preferably in the range from 50 to 250 and at least one neutralizing agent to temperatures preferably in the range from 50 to 150° C. for a time of at least half a minute whereby the organic polymeric material is neutralized preferably for at least 50%, then by cooling and moving the composition which has then a pH in the range from 6 to 10.5, whereby optionally a part of the same constituents or a part of all of further constituents to be added to the aqueous composition may be added during the heating, cooling or afterwards or in any combination of these. The acid number is defined as the consumption of the number of carboxyl groups during the preparation.

The content of the neutralizing agent(s) B) in the aqueous composition may preferably be varied in the range from 1 to 50 g/L calculated as the active compounds, more preferred in the range from 3 to 42 g/L, much more preferred in the range from 4 to 34 g/L, most preferred in the range from 5 to 30 g/L, especially in the range from 6 to 25 g/L, especially of about 4 g/L, of about 5 g/L, of about 6 g/L, of about 7 g/L, of about 8 g/L, of about 9 g/L, of about 10 g/L, of about 11 g/L, of about 12 g/L, of about 13 g/L, of about 14 g/L, of about 15 g/L, of about 16 g/L, of about 18 g/L, of about 20 g/L or of about 22 g/L or in any ranges in between any of these data.

Preferably, ammonia or any other volatile alkaline neutralizer like any compound on the base of amine like alkanolamines, trialkylamines, triethanolamine and morpholine may be used as a neutralizing agent B). The addition of at least one neutralizing agent B) will typically lower the pH of the aqueous composition. The neutralizing agent(s) are especially to be used to neutralize the organic polymeric material. It may help to control the pH of the aqueous composition. If there is no neutralizing agent added, then there may be often problems to generate the dispersion of the copolymeric material(s). If there is a too high addition of neutralizing agent(s), then this may affect the stability of the aqueous composition by gelling or settling. Such agent may evaporate from the wet film, this means, during the drying in the short time between applying the aqueous composition onto the surface of the metallic component (=beginning of the coating process) and reaching the dry status of the coating. As chemical reactions in the wet film, reactions of at least one cross-linking agent with the organic copolymeric material(s) may occur, thereby terminating the carboxyl groups into a status of the dispersion where the dispersion is no longer water-dispersible but water-resistant, dry and no longer water-reemulsifiable. All these actions assist in the preparation of a water-insoluble flexible solid dry film, which is called the coating.

The concentrated neutralizing agent B) dissolved in water may itself preferably have a pH in the range from 7 to 14, more preferred in the range from 7.2 to 12. If the pH of the aqueous composition is maintained in the range from 8 to 9, then there may often be a better stability of the aqueous composition than if the pH would be higher, otherwise there may be the risk of early gelling.

The low temperature corrosion inhibiting cross-linking agents C) may preferably be selected from the group consisting of compounds of lithium, sodium, potassium, rubidium, cesium, calcium, magnesium, strontium, barium, yttrium, titanium, hafnium, zirconium, manganese, iron, cobalt, nickel, copper, zinc, niobium, molybdenum, boron, silicon like a silane/silanol/siloxane/polysiloxane and phosphorus and at least one lanthanide chemical element containing compounds like cerium compounds whereby they complex a chemical group of organic film-forming polymeric material(s) like a carboxyl group and cause the insolubility of the organic copolymeric material(s) after drying. More preferred, the particles, nanoparticles, gels, sols or any combination of these are of inorganic materials like oxides, hydroxides, carbonates, water-insoluble sulfates, silicates or any combination thereof e.g. of magnesium, calcium, aluminum, boron, silicon, titanium, zirconium, hafnium, iron, manganese and zinc. Most preferred, these compounds may be based on silica or may be oxides, hydroxides, carbonates, water-insoluble sulfates, silicates or any combination of these of barium, calcium, titanium, zinc, zirconium and any combination thereof.

According to the process of the invention, the low temperature corrosion inhibiting cross-linking agent(s) C) may preferably be blocked. The blocking may preferably be achieved e.g. by a metal chelate and may be deblocked in an acidic medium, e.g. in a medium of a pH e.g. of below 7. The non-reacted blocking compounds as well as the blocked low temperature corrosion inhibiting cross-linking agent(s) belong to the constituent C).

The content of the low temperature corrosion inhibiting cross-linking agent(s) C) or any combination of agents to be used for the cross-linking of the organic copolymeric material(s) in the aqueous composition may preferably be varied in the range from 0.1 to 100 g/L calculated as the active compounds, more preferred in the range from 3 to 90 g/L, much more preferred in the range from 5 to 75 g/L, most preferred in the range from 7 to 60 g/L, especially in the range from 9 to 50 g/L or in the range from 10 to 40 g/L, especially of about 8 g/L, of about 10 g/L, of about 12 g/L, of about 15 g/L, of about 20 g/L, of about 25 g/L, of about 30 g/L, of about 35 g/L, of about 40 g/L, of about 50 g/L, of about 55 g/L, of about 60 g/L or of about 65 g/L or in any ranges in between any of these data. The amount of such agents depends essentially on the type and on the physical condition of the material and of the surface of the metallic component and further on of the composition, if there is a chromium addition or not.

The total content of particles, nanoparticles, gels, sols or any combination of these of the constituent C) in the aqueous composition may preferably be varied in the range from 1 to 100 g/L calculated as the active compounds, more preferred in the range from 10 to 90 g/L, much more preferred in the range from 20 to 85 g/L, most preferred in the range from 40 to 80 g/L, especially of about 15 g/L, of about 20 g/L, of about 25 g/L, of about 30 g/L, of about 35 g/L, of about 40 g/L, of about 45 g/L, of about 50 g/L, of about 55 g/L, of about 60 g/L, of about 65 g/L, of about 70 g/L, of about 75 g/L, of about 80 g/L, of about 85 g/L or of about 90 g/L or in any ranges in between any of these data. Preferably, the particles, nanoparticles, gels, sols or any combination of these are added as a powder or as a dispersion.

If there is no corrosion inhibiting cross-linking agent added, then there may occur limited performance properties such as a low chemical resistance and a low corrosion resistance of the coating. If there is a too high addition of the corrosion inhibiting cross-linking agent(s), then this may affect the stability of the aqueous composition or the film formation by generating flaws or both.

According to the process of the invention, the aqueous composition may preferably contain at least one chromium compound selected from the group consisting of chromates and dichromates of ammonium, lithium, sodium and potassium as constituent C). The chromium ions respectively the dried chromium compounds may be present as $Cr^{3+}$ or $Cr^{6+}$ or both. If chromium compounds are added, it is preferred to add only a limited content because of its poisonous effects. In many cases, there is no need to add more than 50 or more than 30 g/L of the chromate or dichromate or both. In some cases, the coating according to the invention contains a content of chromium in the range from 0.5 to 28 $mg/m^2$, sometimes in the range from 5 to 25 $mg/m^2$, often in the range from 8 to 15 $mg/m^2$.

The cross-linking of the organic film-forming material(s) may preferably be performed during the drying. According to the process of the invention, the aqueous composition as well as the composition of the drying film or of the dried film are more preferred such that the cross-linking of the organic film-forming material(s) may be performed at a temperature in the range from 5 to 80° C., preferably in the range from 10 to 50° C. This low cross-linking temperature is often possible as cross-linking agents are preferred that work in such temperature range, especially in a temperature range of up to 60° C., of up to 50° C., of up to 40° C. or even up to 30° C., especially at room temperature. With the process according to the invention, the aqueous composition may be formed e.g. at a temperature of e.g. 65° C. or below e.g. 65° C. without the need of any cosolvent to reduce the temperature of film-forming for the organic copolymeric material(s). Nevertheless, the aqueous compositions containing such low temperature cross-linking agents will in many cases even work at significantly higher temperatures and may optionally be used at a high temperature much above e.g. 80° C. The cross-linking may preferably be performed with a blocked cross-linking agent that may become active e.g. after the evaporation of at least one alkaline compound like ammonia or after a reaction that renders the aqueous composition less alkaline or even acidic, whereby the pH is reduced and the cross-linking agent is deblocked. Then—in such low temperature range of e.g. up to 50° C.—the cross-linking agent may chemically react with at least one organic polymeric material generating bigger molecules and optionally even creating a polymeric network.

Preferably, the cross-linking of the ionomeric or nearly ionomeric copolymeric material(s) is in many embodiments performed without any addition or without any substantial addition of cross-linkers as typically used for chemical cross-linking by heating to higher temperatures e.g. in the range from 100 to 300° C. with compounds like such on the base of isocyanate, isocyanurate or melamine, but only or mostly with any constituent C). But there may occur some embodiments where the ionomeric or nearly ionomeric polymeric material is going to be cross-linked or is at least to a certain content cross-linked with at least one low temperature corrosion inhibiting cross-linking agent like any constituent C) and the further organic film-forming polymer/copolymer/block-copolymer A') is going to be cross-linked or is at least to a certain content cross-linked with at least one cross-linker as typically used for chemical cross-linking by heating to higher temperatures, e.g. on the base of isocyanate, isocyanurate or melamine. In such prepared coating, there may be mixed a certain content of the different types of cross-linkers that are not clearly coordinated to the type of the copolymeric/polymeric material A) respectively A') in the micro-scale as a fine distribution or even certain homogenization of the different constituents in the coatings is intended.

The content of water in the aqueous composition may be varied in broad ranges, preferably varied in the range from 400 to 950 g/L, more preferred in the range from 450 to 930 g/L, much more preferred in the range from 500 to 910 g/L, most preferred in the range from 550 to 900 g/L, especially in the range from 600 to 850 g/L, especially of about 550 g/L, of about 600 g/L, of about 650 g/L, of about 700 g/L, of about 750 g/L, of about 800 g/L, of about 850 g/L or of about 900 g/L or in any ranges in between any of these data. Preferably, the water added is preferably added as deionized water or as tap water if it is of low hardness.

If the aqueous composition according to the invention would not have any chromium content this solution or dispersion would normally be stable for years. If such aqueous compositions would have a significant chromium content, then its stability may in some cases be influenced to an early gelling, especially if there is a high chromium content or a high ratio of chromium to total organic polymeric material. The higher the total solids' content respectively the content of organic copolymeric/polymeric material(s), the less stable may be a solution or dispersion containing a high chromium content.

In few cases, the aqueous composition will only consist of the constituents A) and C) and optionally of A'), B) or both. In many cases, the aqueous composition will only consist of the constituents A), C) and one to three different constituents selected of the constituents a) to j) and optionally of A'), B) or both. In few cases, the aqueous composition will only consist of the constituents A), C) and four to six or seldom even more different constituents selected of the constituents a) to j) and optionally of A'), B) or both.

The coating weight of the coatings generated with an aqueous composition according to the invention are typically in the range from 0.1 to 20 g/m², often in the range from 0.3 to 12 g/m² and sometimes in the range 0.6 to 5 g/m², especially of about 0.7 g/m², of about 0.8 g/m², of about 0.9 g/m², of about 1 g/m², of about 1.1 g/m², of about 1.2 g/m², of about 1.3 g/m², of about 1.4 g/m², of about 1.5 g/m², of about 1.6 g/m², of about 1.7 g/m², of about 1.8 g/m², of about 1.9 g/m², of about 2 g/m², of about 2.2 g/m², of about 2.5 g/m² or in any ranges in between any of these data. The coatings may often show a coating thickness in the range from 0.2 to 3 μm, especially in the range from 0.4 to 2.5 μm.

According to the process of the invention, there may be further added to the aqueous composition at least one constituent selected from the group consisting of:

a) acidic catalyst(s), like phosphorus or sulfur containing acids like orthophosphoric acid, like any sulfonic acid or like paratoluol sulfonic acid (PTSA) as well as their corresponding esters and like carboxylic acids like acetic essig, hydroxyacetic acid, lactic acid and citric acid, b) rheology controlling agent(s) like organic oligomer(s)/polymer(s), silica, sheet silicatic materials like clay(s)/bentonite(s) and titanium compound(s), especially like acrylic or urethane oligomer(s)/polymer(s), c) wetting agent(s) like silane(s)/silanol(s)/siloxane(s)/polysiloxane(s), organic oligomer(s)/polymer(s), alcohol(s)/glycol(s) and other surface tension reducing compound(s), d) adhesion promoting agent(s) like silane(s)/silanol(s)/siloxane(s)/polysiloxane(s), phosphorus containing acids' esters as well as organic polymers that have a reactive polar group like epoxy groups, e) film-forming agent(s) like long-chain alcohols preferably having a chain length in the range from 4 to 20 C-atoms or phthalates, more preferred, long-chain glycol(s) like propylene glycol(s), ester alcohol, glycol ether, butandiol or any combination of these, that are at least partially able to make the film more flexible, to cause a lower hardness of the coating and to improve the adhesion, especially in the deformed areas of the coating and the substrate, f) defoaming agent(s) like short-chain paraffin(s), alcohol(s), hydrocarbon(s) and silicone(s), that are all nearly or totally water-insoluble, g) UV absorber(s), light stabilizer(s) or both, h) further agent(s) like photoinitiators, like antioxidants, like dyes, like coloring pigments as well as like other types of cross-linkers and j) organic solvent(s) like short-chain alcohol(s)/glycol(s)/glycol ester(s) like hexanol, diethylene butyl ester, isopropyl alcohol, butanol, propylene glycol, a esteralcohol, a glycolether, butandiol and N-methylpyrrolidon.

Sometimes or often, the same compound added may have the functions as of more than one compound mentioned above.

The acidic catalyst(s) of the constituent a) may preferably be at least one of each of phosphorus or sulfur containing acids like orthophosphoric acid, like any sulfonic acid, like paratoluol sulfonic acid (PTSA) as well as their corresponding esters, any tin containing catalysts, any carboxylic acids like acetic acid, hydroxyacetic acid, lactic acid and citric acid or any combination thereof. The content of acidic catalyst(s) in the aqueous composition may be zero or may preferably be varied in the range from 0.01 to 10 g/L calculated as the active compounds, more preferred in the range from 0.03 to 6 g/L, much more preferred in the range from 0.05 to 3 g/L, most preferred in the range from 0.08 to 0.5 g/L, especially of about 0.1 g/L, of about 0.15 g/L, of about 0.2 g/L, of about 0.25 g/L, of about 0.3 g/L, of about 0.35 g/L, of about 0.4 g/L or of about 0.45 g/L or in any ranges in between any of these data.

If there is no acidic catalyst added, then there will be often limited performance properties such as chemical resistance and corrosion resistance of the coating. If there is a too high addition of the acidic catalyst, then the stability of the aqueous composition may be affected e.g. by gelling and the coating could become water-sensitive.

It has to be taken care that in several cases even a small amount of any surfactant(s) may affect the stability of the aqueous composition as well as the coating properties of the coatings generated from it like the corrosion resistance. Therefore, it is preferred to avoid all or any effective amount of surfactants.

The rheology controlling agent(s) of the constituent b) may preferably be organic oligomer(s)/polymer(s), silica, sheet silicatic materials like clay(s)/bentonite(s), titanium compound(s) or any combination of these, especially acrylic or urethane oligomer(s)/polymer(s). More preferred, the rheology controlling agent(s) added is an acrylic polymer, a bentonite or silica nanoparticles or any combination of these. Rheology controlling agents may preferably be added to increase the coating weight if necessary. The content of rheology controlling agent(s) in the aqueous composition may be zero or may preferably be varied in the range from 0.01 to 10 g/L calculated as the active compounds, more preferred in the range from 0.03 to 8 g/L, much more preferred in the range from 0.05 to 5 g/L, most preferred in the range from 0.08 to 2 g/L, especially of about 0.1 g/L, of about 0.2 g/L, of about 0.3 g/L, of about 0.4 g/L, of about 0.5 g/L, of about 0.6 g/L, of about 0.7 g/L, of about 0.8 g/L, of about 0.9 g/L, of about 1.0 g/L, of about 1.1 g/L, of about 1.2 g/L, of about 1.3 g/L, of about 1.4 g/L, of about 1.5 g/L, of about 1.6 g/L, of about 1.7 g/L, of about 1.8 g/L or of about 1.9 g/L or in any ranges in between any of these data.

If there is no rheology controlling agent added, then there may occur problems to achieve the coating weight desired. If there is a too high addition of the rheology controlling agent(s), then the viscosity of the aqueous composition may be too high and lead to improper application and flaws in the coating.

There may be added wetting agent(s) of the constituent c) like silane(s)/silanol(s)/siloxane(s)/polysiloxane(s), organic oligomer(s)/polymer(s), alcohol(s)/glycol(s), other surface tension reducing compound(s) or any combination thereof. Preferably, the wetting agent(s) added may be at least one compound on the base of polysiloxanes, acrylics, long-chain compounds like glycols, polyglycols, succinic acid, sulfosuccinic acid or any combination thereof. The content of wetting agent(s) in the aqueous composition may be zero or may preferably be varied in the range from 0.01 to 10 g/L calculated as the active compounds, more preferred in the range from 0.03 to 8 g/L, much more preferred in the range from 0.06 to 5 g/L, most preferred in the range from 0.1 to 2 g/L, especially of about 0.3 g/L, of about 0.5 g/L, of about 0.8 g/L, of about 1.1 g/L or of about 1.5 g/L or in any ranges in between any of these data. Wetting agents may preferably be added to the aqueous composition if there is a metallic surface used that is hard to wet, e.g. as it is very smooth. If there is no wetting agent added, then the film quality may be affected by voids, striations and partial wetting of the metallic surface. If there is a too high addition of the wetting agent(s), then the coating may be too water-sensitive.

The adhesion promoting agent(s) of the constituent d) may preferably be silane(s)/silanol(s)/siloxane(s)/polysiloxane(s), phosphorus containing acids' esters and organic polymers that have a reactive polar group like epoxy groups or any combination of these. Preferably, the adhesion promoting agent(s) added is isopropyl alcohol, propylene glycol, butyl benzol phthalate or any combination of these. Preferably, the at least one adhesion promoting agent added is at least one compound selected from the group of silanes/siloxanes/polysiloxanes or any compound derived from it or any combination of these. The content of adhesion promoting agent(s) in the aqueous composition may be zero or may preferably be varied in the range from 0.01 to 10 g/L calculated as the active compounds, more preferred in the range from 0.03 to 8 g/L, much more preferred in the range from 0.05 to 5 g/L, most preferred in the range from 0.08 to 2 g/L, especially of about 0.1 g/L, of about 0.2 g/L, of about 0.3 g/L, of about 0.4 g/L, of about 0.5 g/L, of about 0.6 g/L, of about 0.7 g/L, of about 0.8 g/L, of about 0.9 g/L, of about 1.0 g/L, of about 1.1 g/L, of about 1.2 g/L, of about 1.3 g/L, of about 1.4 g/L, of about 1.5 g/L, of about 1.6 g/L, of about 1.7 g/L, of about 1.8 g/L or of about 1.9 g/L or in any ranges in between any of these data.

Adhesion promoting agent(s) d) may be needed if there is a certain content of at least one further organic polymer/copolymer participating for the rest of the total organic polymeric material as constituent A'), their corresponding oligomers/co-oligomers/monomers/comonomers or any combination thereof. Adhesion promoting agents may be further on added to correct the adhesion properties if there would be a further layer applied to the organic coating according to the invention which may cause problems by sticking. If there is no adhesion promoting agent added, then there may occur a loss of adhesion of the organic coating to the metallic surface or the adhesion to the succeeding paint layer. If there is a too high addition of the adhesion promoting agent(s), then this may affect the film integrity.

The film-forming agent(s) of the constituent e) may preferably be at least one long-chain alcohol like long-chain glycols as well as like phthalates, preferably like propylene glycols, ester alcohols, glycol ethers, propylene glycols, glycol ethers, butandiol, isopropyl alcohol, dibutyl phthalate, butyl benzol phthalate or any combination of these. They may preferably be added to make the coating more flexible, to cause a lower hardness of the coating and to improve its adhesion, especially in the deformed areas of the coating and the substrate. The long-chain alcohols, especially such with 4 to 20 C-atoms, may be selected from the group consisting of butandiols, butylglycols, butyldiglycols, ethylene glycolethers like ethylene glycol monobutylether, ethylene glycolmonoethylether, ethylene glykolmono-methylether, ethylglycolpropylether, ethylene glycolhexylether, diethylene glycol-methylether, diethylene glycolethylether, diethylene glycolbutylether, diethylene glycolhexylether or polypropylene glycolethers like propylene glycolmonomethylether, dipropylene glycolmonomethylether, tripropylene glycolmonomethylether, propylene glycolmonobutylether, dipropylene glycolmonobutylether, tripropylene glycolmono-butylether, propylene glycolmonopropylether, dipropylene glycolmonopropylether, tripropylene glycolmonopropylether, propylene glycolphenylether, trimethylpentan-dioldiisobutyrat, polytetrahydrofurans, polyetherpolyols and polyesterpolyols. Film-forming agent(s) e) may sometimes be needed if there is a certain content of at least one further organic film-forming polymer/copolymer/blockcopolymer A') or their corresponding oligomers/cooligomers/monomers/comonomers like any acrylic or epoxy or urethane containing resin not being an ionomeric resin, participating for the rest of the total organic polymeric material to 100% by weight. Film-forming agents may preferably be used, when there is added a further organic polymeric material. They may function as a cosolvent. The content of film-forming agent(s) in the aqueous composition may be zero or may preferably be varied in the range from 0.05 to 50 g/L calculated as the active compounds, more preferred in the range from 0.1 to 30 g/L, much more preferred in the range from 0.3 to 10 g/L, most preferred in the range from 0.5 to 3 g/L, especially of about 0.6 g/L, of about 0.7 g/L, of about 0.8 g/L, of about 0.9 g/L, of about 1.0 g/L, of about 1.1 g/L, of about 1.2 g/L, of about 1.3 g/L, of about 1.4 g/L, of about 1.5 g/L, of about 1.6 g/L, of about 1.7 g/L, of about 1.8 g/L, of about 1.9 g/L, of about 2.0 g/L, of about 2.1 g/L, of about 2.2 g/L, of about 2.3 g/L, of about 2.4 g/L, of about 2.5 g/L, of about 2.6 g/L, of about 2.7 g/L, of about 2.8 g/L or of about 2.9 g/L or in any ranges in between any of these data.

The defoaming agent(s) of the constituent f) may preferably be short-chain paraffin(s), alcohol(s) hydrocarbon(s) and silicone(s) or any combination thereof that are all water-insoluble. Preferably, the defoaming agent(s) added is an aliphatic hydrocarbon, silica-modified aliphatic hydrocarbon, high-molecular weight alcohols or any combination of these. The content of further agent(s) like defoaming agent(s) in the aqueous composition may be zero or may preferably be varied in the range from 0.01 to 10 g/L calculated as the active compounds, more preferred in the range from 0.03 to 8 g/L, much more preferred in the range from 0.05 to 5 g/L, most preferred in the range from 0.08 to 2 g/L, especially of about 0.1 g/L, of about 0.2 g/L, of about 0.3 g/L, of about 0.4 g/L, of about 0.5 g/L, of about 0.6 g/L, of about 0.7 g/L, of about 0.8 g/L, of about 0.9 g/L, of about 1.0 g/L, of about 1.1 g/L, of about 1.2 g/L, of about 1.3 g/L, of about 1.4 g/L, of about 1.5 g/L, of about 1.6 g/L, of about 1.7 g/L, of about 1.8 g/L or of about 1.9 g/L or in any ranges in between any of these data.

If there is no defoaming agent f) added, then the foam generated may be disturbing or the possibility of forming a homogeneous and flexible coating showing integrity and lacking voids is reduced or both may occur; there may be even an easily fractured coating. If there is a too high addition of the defoaming agent(s), then this may cause voids in the coating.

There may be added at least one further agent of the constituent g) may preferably be at least one UV absorber, at least one light stabilizer or any other kind of at least one cross-linker or any combination of these—not preventing any further agent having any function not yet mentioned to be further added in an amount of up to 0.5 g/L each. The content of UV absorber(s) or of light stabilizer(s) or of both in the aqueous composition may be zero or may preferably be varied in the range from 0.01 to 10 g/L calculated as the active compounds, more preferred in the range from 0.03 to 6 g/L, much more preferred in the range from 0.05 to 4 g/L, most preferred in the range from 0.08 to 2.0 g/L, especially of about 0.1 g/L, of about 0.2 g/L, of about 0.3 g/L, of about 0.4 g/L, of about 0.5 g/L, of about 0.6 g/L, of about 0.7 g/L, of about 0.8 g/L, of about 0.9 g/L, of about 1.0 g/L, of about 1.1 g/L, of about 1.2 g/L, of about 1.3 g/L, of about 1.4 g/L, of about 1.5 g/L, of about 1.6 g/L, of about 1.7 g/L, of about 1.8 g/L or of about 1.9 g/L or in any ranges in between any of these data. Such agents may help to protect the organic coating not to be affected by energy-rich light and to keep the colors and clearness of the coating.

There may be added at least one further agent of the constituent h) like at least one compound selected from the group consisting of photoinitiators, antioxidants, dyes, coloring pigments and other types of cross-linkers than the low temperature corrosion inhibiting cross-linking agents C). An antioxidant may help to avoid the early coloration e.g. into yellow colors and the early destruction of a coating if a coating should be heated up to a higher temperature, e.g. for about one hour at a temperature in a range of from 120 to 200° C. The dyes or pigments or both shall help to make the coating better visible or even colored. The pigments are preferably very fine, more preferred having a mean particle diameter of less than 1 µm.

The content of photoinitiators, antioxidants, other types of cross-linkers or any combination thereof h) in the aqueous composition may be zero or may preferably be varied in the range from 0.01 to 50 g/L calculated as the active compounds, more preferred in the range from 0.03 to 40 g/L, much more preferred in the range from 0.05 to 30 g/L, most preferred in the range from 0.08 to 20 g/L, especially of about 0.1 g/L, of about 0.2 g/L, of about 0.3 g/L, of about 0.4 g/L, of about 0.5 g/L, of about 0.6 g/L, of about 0.7 g/L, of about 0.8 g/L, of about 0.9 g/L, of about 1.0 g/L, of about 1.1 g/L, of about 1.2 g/L, of about 1.3 g/L, of about 1.4 g/L, of about 1.5 g/L, of about 1.6 g/L, of about 1.7 g/L, of about 1.8 g/L or of about 1.9 g/L or in any ranges in between any of these data. Typically, if there is a content of a high temperature cross-linker, then its content is typically very high. Such agents may help to cross-link the organic copolymeric/polymeric material(s) A) or A') or both chemically or physically or both.

The content of all constituents a) to h) except the content of high temperature cross-linkers alltogether Present in the aqueous composition may be varied in broad ranges. If this content is not zero, it is preferably varied in the range from 0.01 to 80 g/L, more preferred in the range from 0.05 to 60 g/L, much more preferred in the range from 0.1 to 40 g/L, most preferred in the range from 0.5 to 30 g/L, especially in the range from 0.8 to 22 g/L or in the range from 1 to 14 g/L, especially of about 1 g/L, of about 2 g/L, of about 3 g/L, of about 4 g/L, of about 5 g/L, of about 6 g/L, of about 7 g/L, of about 8 g/L, of about 9 g/L, of about 10 g/L, of about 11 g/L, of about 12 g/L, of about 13 g/L, of about 14 g/L, of about 15 g/L, of about 16 g/L, of about 17 g/L, of about 18 g/L, of about 19 g/L, of about 20 g/L, of about 21 g/L or of about 22 g/L or in any ranges in between any of these data.

The organic solvent(s) of the constituent j) may preferably be short-chain alcohol(s)/glycol(s)/glycol ester(s) like hexanol, propylene glycol, an esteralcohol, a glycolether, diethylene butyl ester, ethanol, butanol, isobutanol, secondary butanol, propanol, isopropanol, butandiol, N-methylpyrrolidon or any combination thereof. Preferably, an organic solvent is only added if it is needed for at least one other constituent present in the aqueous composition or added to any raw material. The content of organic solvent(s) in the aqueous composition may be zero or may preferably be varied in the range from 0.1 to 250 g/L calculated as the compound, more preferred in the range from 0.5 to 200 g/L, much more preferred in the range from 2 to 150 g/L, most preferred in the range from 10 to 100 g/L, especially of about 25 g/L, of about 40 g/L, of about 55 g/L, of about 70 g/L or of about 85 g/L or in any ranges in between any of these data. More preferred, the organic solvent(s) added may be ethanol, butanol, isobutanol, secondary butanol, propanol, isopropanol or any combination of these.

According to the process of the invention, the coating may be dried at any temperature, but may preferably be dried at a temperature in the range from 1 to 98° C., more preferred in the range from 5 to 80° C., even more preferred in the range from 8 to 65° C., most preferred in the range from 10 to 50° C., especially in the range from 12 to 35° C. or in the range from 14 to 30° C. or in the range from 15 to 28° C., even at about room temperature. In some cases, it is quite sufficient to let the wet film of the aqueous composition be dried at about room temperature or at a temperature of about 30° C. Many compositions according to the invention do not require any heating to cross-link the constituents of the generated coating. In some cases, there may be a heating in the range of up to 80° C., sometimes to enhance the cross-linking of the organic copolymeric/polymeric material(s). Nevertheless, if there would be a heating to higher temperatures than 80° C., this is not necessary, but will normally not affect the properties of the coating, but sometimes even improve them. Instead of only one drying there may be a drying, even perhaps at a lower temperature, and then a heating or any similar process, whereby the at least one heating may preferably be used for the content of the other organic polymeric material A') present in the composition and which may need a high temperature like for chemical cross-linking. There may be even a higher heating for any other purpose.

According to the process of the invention, the coating generated with the aqueous composition on the metallic component is afterwards coated with at least one layer each of a primer, a powder paint, a base coat, a clear coat, an adhesive or any combination of these, whereby these coatings may be performed before or after any forming operation.

According to the process of the invention, the coating generated with the aqueous composition may in some embodiments has the function of a pretreatment primer this means that there is no pretreatment layer rendering corrosion resistance and paint adhesion under the organic coating generated with the aqueous composition according to the invention. This is possible, as it needs in many cases no classical pretreatment layer like a zinc phosphate layer, an alkali metal phosphate layer or a chromate layer. Then, at least one process step and at least one coating are saved.

According to the process of the invention, there may preferably be applied a coating of any composition containing at least one forming agent like any oil or wax or both on the coating prepared with the aqueous composition according to the invention whereby the such coated metallic component may be used for a heavy forming operation like deep-drawing.

According to the process of the invention, the coating generated with the aqueous composition may preferably be joined by the aid of at least one adhesive with any paper, any foil, any sheet or any other part. Preferably, a polyurethane foam or a paste, an ink, a solution or a dispersion of a silicone adhesive, a starch adhesive, an acrylic adhesive, an epoxy adhesive, a polysulfide adhesive or of a polyurethane adhesive may be used as an adhesive or any combination of these.

The aqueous compositions according to the invention may be used to coat metallic components like coils, sheets, plates, foils, plastic laminated metal foils, other laminated components, parts of any shape, wires or any combination of these to generate organic coatings with a high flexibility and high resistance against corrosion. Such compositions may be used for the production e.g. of corrugated iron, gutters, profiles, tubings, automotive stampings, housings, electronic equipment or guard rails. Such components may be used for inside and outside architectural use, aerospace industry, automotive industry, apparatuses, appliance industry, construction, roofing, siding, transport, ventilating, cylinders, fasteners, shafts, containers or tanks.

It was astonishing that the very thin organic coatings that have often a coating thickness in the range from 0.2 to 3 μm or even in the range from 0.5 to 2.5 μm show such excellent corrosion protection results as well as such excellent wear resistance although the coefficient of friction is in the range of about 0.2 which is well adapted to industrial uses.

It was further astonishing that such organic coatings are of an excellent formability even without using waxes and without using oils as constituents in the aqueous composition used for the coating or as a further layer on the coating.

Further on, it succeeded to significantly reduce the raw materials costs as well as the process costs by lowering the heat and temperature for drying or in some cases even by avoiding any heating for the drying or any other heating or both.

The method of production of metallic components coated with an aqueous composition according to the invention is significantly easier than with the aqueous compositions of the state of the art for coatings of similar use. The metallic components coated with an aqueous composition according to the invention allow an optimized forming operation without an increase of forces, of the coefficient of friction and of wear.

It succeeded to avoid or reduce the content of chromium containing compounds in a significant extent without loosing the excellent properties of the coatings according to the invention.

It is the first time according to the knowledge of the inventors that such an organic composition to be used for very thin organic coatings having a coating thickness of below 3 or of below 2.5 μm is described that is in some embodiments free or nearly free of any chromium compounds or even containing up to 10 g/L of chromium containing compounds calculated as $CrO_3$ and that may be cross-linked or homogenously filmed at temperatures below 50° C.

EXAMPLES AND COMPARISON EXAMPLES

The examples and comparison examples described in the following are intended to elucidate the subject-matter of the invention in more detail. The specified concentrations and compositions relate to the aqueous composition as used in the bath or as added to the bath or both and must not be identical with the initial solutions/dispersions of mostly higher concentrations (concentrates) or with the replenishing solutions/dispersions to replenish the consumption of chemical constituents in the bath. The addition of several constituents was in such constitution that some of the raw materials added showed a certain content of water or organic solvent or both that was recalculated.

Commercially available steel panels of cold rolled steel (CRS), of hot dip galvanized steel (HDG) and of Galvalume® (55% AlZn) were used for the following experiments and tests.

First, the CRS panels were degreased in an alkaline spray cleaner. Then, all kinds of steel panels as mentioned above were treated with the aqueous composition according to the invention as shown in table 2. In this treatment, a defined quantity of the aqueous composition (bath solution/dispersion) was applied in such a way with the aid of a roll coater that a wet film thickness of about 4 mg/m² arose. The aqueous composition was applied at a temperature of about 20° C. with a velocity of about 20 m/min. Subsequently, the wet film was dried at a temperature of about 65.5° C. (150 F) PMT (peak-metal-temperature) which needs about 140° C. of a laboratory convection oven for 25 seconds of time in the oven. The dry films (the coatings) showed a coating weight of about 8 to 12 mg/m².

TABLE 1

Composition and properties of the different raw materials used:
EAA = ethylene acrylic acid,
C = low temperature corrosion inhibiting agent

| Amount in g/L | Composition and approximate data of properties: |
|---|---|
| EMAA1 | ethylene methacrylic acid copolymer based dispersion |
| EAA1 | ethylene acrylic copolymer based dispersion, melting point 75° C., melt index 1300, molecular weight 6000, $T_g$ about −8° C. |
| EAA2 | ethylene acrylic copolymer based dispersion, melting point 77° C., melt index 300, molecular weight 8000, $T_g$ about −8° C. |
| PUAR | polyurethane acrylic acid copolymer based dispersion |
| AR1 | acrylic resin with $T_g$ of 16° C. and an acid number of about 30 |
| AR2 | acrylic resin with $T_g$ of 35° C. and an acid number of about 30 |
| Neutralizing Agent1 | $NH_4OH$ |
| Neutralizing Agent2 | alkanolamine |

TABLE 2

Composition of the bath liquids of inventive examples B of comparison examples VB: EAA = ethylene acrylic acid, C = low temperature corrosion inhibiting agent, concentration data in g per liter

| | |
|---|---|
| C1 | ammonium dichromate |
| C2 | ammonium zirconium carbonate |
| C3 | $TiO_2$ nanoparticles |
| C4 | $K_2CrO_3$ |
| Add1 | oxidized polyethylene wax |
| Add2 | nanoparticles of $SiO_2$ |
| DI Water | deionized water |
| Catalyst | PTSA |
| wetting agent | polysiloxane |
| adhesion promoting agent | epoxysilane |
| Defoamer | aliphatic hydrocarbon |
| UV-Absorber | benzotriazole |
| light stabilizer | hindered amine |

List of Abbreviations as used in Table 2:
Storage stability: VG=very good, G=good, Gel=gelled
Stability of the composition: Y=yes, N=no, HV=high viscosity (upper end)
Visual appearance: Br=bright, this means: not yellow and okay
NDC=no discoloration, LDC=low discoloration
Tests: F=failed, P=passed, Ok=okay,
Blank fields: No panels, no results.

| | Example/Comp. Ex. | | | | | | | | | | | | | |
|---|---|---|---|---|---|---|---|---|---|---|---|---|---|---|
| | E1 | E2 | E3 | E4 | E5 | E6 | E7 | E8 | E9 | E10 | E11 | E12 | E13 | E14 |
| Amount in g/L: | | | | | | | | | | | | | | |
| EMAA1 | 240.0 | 100.0 | | | | | | | | | | | | |
| EAA1 | | 130.0 | 230.0 | 240.0 | 120.0 | | | | | | | | | |
| EAA2 | | | | | 120.0 | 192.0 | 200.0 | 200.0 | 240.0 | 240.0 | 192.0 | 230.0 | 242.0 | 240.0 |
| AR1 | | | | | | | | 40.0 | | | | | | |
| AR2 | | | | | | | | | 40.0 | | | | | |
| Neutralizing Agent 1 | 24.0 | 24.0 | 24.0 | 24.0 | 24.0 | 30.0 | 20.0 | 20.0 | | 24.0 | 19.0 | 23.0 | 24.0 | 30.0 |
| Neutralizing Agent 2 | | | | | | | | | 24.0 | | | | | |
| C1 | 10.0 | 20.0 | 20.0 | 10.0 | 10.0 | 8.0 | 10.0 | 10.0 | 10.0 | 10.0 | 8.0 | | 8.0 | 10.0 |
| C4 | | | | | | | | | | | | 20.0 | | |
| Catalyst | 0.1 | 0.1 | 0.1 | 0.1 | 0.1 | 0.1 | 0.1 | 0.1 | 0.1 | 0.1 | 0.1 | 0.1 | 0.1 | 0.1 |
| Wetting agent | 3.0 | 3.0 | | 3.0 | 3.0 | 3.0 | 3.0 | 3.0 | 3.0 | 3.0 | 3.0 | 3.0 | 3.0 | 3.0 |
| Defoamer | 1.0 | 1.0 | 1.0 | 1.0 | 1.0 | 1.0 | 1.0 | 1.0 | 1.0 | 1.0 | 1.0 | 1.0 | 1.0 | 1.0 |
| UV-Absorber | 1.0 | 1.0 | | 1.0 | 1.0 | 1.0 | 1.0 | 1.0 | 1.0 | 1.0 | 1.0 | 1.0 | 1.0 | 1.0 |
| Light Stabilizer | 1.0 | 1.0 | 1.0 | 1.0 | 1.0 | 1.0 | 1.0 | 1.0 | 1.0 | 1.0 | 1.0 | 1.0 | 1.0 | 1.0 |
| Sum without DI-water | 280.1 | 280.1 | 276.1 | 280.1 | 280.1 | 236.1 | 276.1 | 276.1 | 280.1 | 280.1 | 225.1 | 279.1 | 280.1 | 286.1 |
| DI-Water | 719.9 | 719.9 | 723.9 | 719.9 | 719.9 | 763.9 | 723.9 | 723.9 | 719.9 | 719.9 | 774.9 | 720.9 | 719.9 | 713.9 |
| Solid's content g/L | 250 | 250 | 250 | 250 | 250 | 200 | 250 | 250 | 250 | 250 | 200 | 250 | 250 | 250 |
| Solid's content weight % | 25 | 25 | 25 | 25 | 25 | 20 | 25 | 25 | 25 | 25 | 20 | 25 | 25 | 25 |
| Storage stability (gel effect) | VG | VG | VG | VG | VG | G | VG | VG | VG | VG | VG | VG | VG | Gel |
| Stable composition | Y | Y | Y | Y | Y | HV | Y | Y | Y | Y | Y | Y | Y | N |
| pH-value | 8.2 | 8.2 | 8.2 | 8.2 | 8.2 | 9.5 | 8.2 | 8.2 | 8.2 | 8.2 | 8.2 | 8.2 | 8.2 | 9.5 |
| Drying temperature p.m.t. °C. | 65 | 65 | 65 | 65 | 65 | 65 | 65 | 65 | 65 | 65 | 65 | 65 | 65 | — |
| Dry film coating weight, g/m² | 1.2 | 1.2 | 1.2 | 1.2 | 1.2 | 1.0 | 1.2 | 1.2 | 1.2 | 1.2 | 1.0 | 1.2 | 1.2 | — |
| Visual appearance | Br | Br | BR | Br | Br | Br | Br | Br | Br | Br | Br | Br | Br | — |
| Corrosion resistance without additional paint: | | | | | | | | | | | | | | |
| Salt-spray ASTM B117 240 h, % corr. | 2 | 0 | 0 | 2 | 5 | 5 | 0 | 0 | 5 | 0 | 5 | 0 | 2 | — |
| Salt-spray ASTM B117 480 h, % corr. | 5 | 0 | 0 | 5 | 5 | 10 | 2 | 2 | 10 | 2 | 20 | 5 | 5 | — |
| Wet stack test, % face corrosion | OK | OK | OK | OK | OK | 10 | OK | OK | 10 | OK | 15 | OK | OK | — |
| Outdoor exposure after 1 year | NDC | NDC | LDC | NDC | NDC | NDC | NDC | NDC | NDC | NDC | NDC | NDC | NDC | — |
| Pin-on-disc test: | | | | | | | | | | | | | | |
| Friction coefficient | 0.2 | 0.2 | 0.2 | 0.2 | 0.2 | 0.2 | 0.2 | 0.2 | 0.2 | 0.2 | 0.2 | 0.2 | 0.2 | — |
| Revolutions until obtaining 0.4 friction | >150 | >150 | >150 | >150 | >150 | 50 | 120 | 120 | >150 | >150 | 50 | >150 | >150 | — |
| Corrosion resistance and paint adhesion with polyester based powder paint: | | | | | | | | | | | | | | |
| Salt-spray ASTM B117 480 h creepage on scribe, mm | 4 | 4 | 4 | 5 | 5 | 7 | 3 | 4 | 5 | 4 | 10 | 4 | 4 | — |
| Cross hutch before humidity test, grade | GT1 | GT1 | GT1 | GT1 | GT1 | GT1 | GT1 | GT1 | GT1 | GT1 | GT1 | GT1 | GT1 | — |
| Cross hutch after 480 h humidity test, grade | GT1 | GT1 | GT1 | GT1 | GT1 | GT3 | GT1 | GT1 | GT1 | GT1 | GT3 | GT1 | GT1 | — |

| | Example/Comp. Ex. | | | | | | | | | | | | |
|---|---|---|---|---|---|---|---|---|---|---|---|---|---|
| | E15 | E16 | E17 | E18 | E19 | E20 | E21 | E22 | E23 | CE1 | CE2 | CE3 | CE4 |
| Amount in g/L: | | | | | | | | | | | | | |
| EAA2 | 235.0 | 288.4 | 210.0 | 240.0 | 238.0 | 235.0 | 170.0 | 250.0 | 235.0 | | | 70.0 | |
| PUAR | | | | | | | | | | 110.0 | | | 80.0 |
| AR1 | | | | | | | | | | 116.0 | 80.0 | 98.0 | 88.0 |
| AR2 | | | | | | | 40.0 | | | | 88.0 | | |
| Neutralizing Agent 1 | 23.0 | 28.0 | 21.0 | 25.0 | 25.0 | 25.0 | 17.0 | 25.0 | 30.0 | 3.0 | 3.0 | 6.0 | 3.0 |
| C1 | 15.0 | 11.6 | | 10.0 | 10.0 | 15.0 | | 15.0 | | 10.0 | | | |
| C2 | | | 40.0 | | | | 40.0 | | 15.0 | | 20.0 | 20.0 | 20.0 |
| C3 | | | | | 2.0 | | | | | | | | |
| Additive 1 | | | | | | | | | | 14.0 | 14.0 | 14.0 | 14.0 |
| Additive 2 | | | | | | | | | | 48.0 | 48.0 | 48.0 | 48.0 |
| Catalyst | 0.1 | 0.1 | | 0.1 | 0.1 | 0.1 | | 0.1 | | | | | |

-continued

| | | | | | | | | | | | | | |
|---|---|---|---|---|---|---|---|---|---|---|---|---|---|
| Wetting agent | 3.0 | 3.0 | | | | | | | | | | | |
| Defoamer | 1.0 | 1.0 | 1.0 | 1.0 | 1.0 | 1.0 | 1.0 | 1.0 | 1.0 | 3.0 | | | |
| UV-Absorber | 1.0 | 1.0 | 2.0 | | | 2.0 | 2.0 | 2.0 | | | | | |
| Light Stabilizer | 1.0 | 1.0 | | | | | | | | | | | |
| Sum without DI-water | 279.1 | 334.1 | 274.0 | 276.1 | 276.1 | 278.1 | 270.0 | 293.1 | 281.0 | 256.0 | 253.0 | 256.0 | 253.0 |
| DI-Water | 720.9 | 665.9 | 726.0 | 723.9 | 723.9 | 721.9 | 730.0 | 706.9 | 719.0 | 744.0 | 747.0 | 744.0 | 747.0 |
| Solid's content g/L | 250 | 300 | 250 | 250 | 250 | 250 | 250 | 265 | 250 | 250 | 250 | 250 | 250 |
| Solid's content weight % | 25 | 30 | 25 | 25 | 25 | 25 | 25 | 26.5 | 25 | 25 | 25 | 25 | 25 |
| Storage stability (gel effect) | VG | G | VG | VG | VG | VG | VG | VG | Gel | VG | VG | VG | VG |
| Stable composition | Y | HV | Y | Y | Y | Y | Y | Y | N | Y | Y | Y | Y |
| pH-value | 8.2 | 8.2 | 8.2 | 8.2 | 8.2 | 8.2 | 8.2 | 8.2 | 9.2 | 8.2 | 8.2 | 8.2 | 8.2 |
| Drying temperature p.m.t. ° C. | 65 | 65 | 65 | 65 | 65 | 65 | 65 | 65 | — | 65 | 65 | 65 | 65 |
| Dry film coating weight, g/m² | 1.2 | 1.4 | 1.2 | 1.2 | 1.2 | 1.2 | 1.2 | 1.3 | — | 1.2 | 1.2 | 1.2 | 1.2 |
| Visual appearance | Br | Br | Br | Br | Br | Br | Br | Br | — | Br | Br | Br | Br |
| Corrosion resistance without additional paint: | | | | | | | | | | | | | |
| Salt-spray ASTM B117 240 h, % corr. | 0 | 0 | 0 | 0 | 0 | 0 | 0 | 0 | — | 0 | 0 | 0 | 0 |
| Salt-spray ASTM B117 480 h, % corr. | 0 | 0 | 5 | 5 | 5 | 0 | 5 | 5 | — | 0 | 0 | 5 | 2 |
| Wet stack test, % face corrosion | OK | OK | OK | OK | OK | OK | OK | OK | — | OK | OK | OK | OK |
| Outdoor exposure after 1 year | NDC | NDC | NDC | LDC | LDC | NDC | NDC | NDC | — | LDC | LDC | LDC | LDC |
| Pin-on-disc test: | | | | | | | | | | | | | |
| Friction coefficient | 0.2 | 0.2 | 0.2 | 0.2 | 0.2 | 0.2 | 0.2 | 0.2 | — | 0.17 | 0.17 | 0.17 | 0.17 |
| Revolutions until obtaining 0.4 friction | >150 | >150 | >150 | >150 | >150 | >150 | 120 | >150 | — | 10 | 20 | 100 | 30 |
| Corrosion resistance and paint adhesion with polyester based powder paint: | | | | | | | | | | | | | |
| Salt-spray ASTM B117 480 h creepage on scribe, mm | 3 | 3 | 4 | 4 | 4 | 3 | 4 | 4 | — | 3 | 4 | 4 | 4 |
| Cross hutch before humidity test, grade | GT1 | GT1 | GT1 | GT1 | GT1 | GT1 | GT1 | GT1 | — | GT1 | GT1 | GT1 | GT1 |
| Cross hutch after 480 h humidity test, grade | GT1 | GT1 | GT1 | GT1 | GT1 | GT1 | GT1 | GT1 | — | GT1 | GT1 | GT1 | GT1 |

Only the non-gelled compositions were applied on the metallic sheets by using a bar-coater which offers a dry film in the range of about 1 to 2 g/m² depending on the concentration of the aqueous composition, mostly using 25% by weight of solid's content. If the solid's content is lower then the dry film thickness is lower, too. After the drying, the coated panels were inspected and tested.

Then, the forming operations were undertaken by the forming tests as listed in table 2: The friction and wear characteristics were tested with the pin-on-disc test. This test enables to check the friction coefficient and its change during mechanical attack by a high number of revolutions of a ball on the coated sheet necessary to obtain a friction coefficient of 0.4 with the help of a pin-on-disc apparatus. The pin-on-disc test correlates well with forming procedures in production having 5 to 20 steps of singular formings in succession. The test results are excellent as there is a practically constant wear and friction behavior after the starting period which keeps typically the friction coefficient at about 0.2. More than 150 revolutions characterize a coating that is extremely stable and provides an excellent forming effect. The organic coatings having a content of a wax additive as well as only other organic polymeric materials A') not being ionomeric copolymeric materials A) show a relatively low coefficient of friction, but a very high wear and a very low wear resistance in the pin-on-disc test (comparison examples CE1, CE2 and CE4). The comparison example having a content of the wax additive 1, of a portion of ionomeric copolymeric materials A) as well as a dominant portion of other organic polymeric materials A') show a low wear, this means a high wear resistance (CE3), but the corrosion resistance is a bit lowered and the costs of the aqueous composition are quite high as only 42% of the film-forming constituents are ionomeric copolymeric materials of low costs.

The following tests are performed exactly as described in the standards. The corrosion tests on not post-painted surfaces were are conducted by measuring the face corrosion percentage. Concerning the corrosion resistance, there are significant differences in the performance especially of the salt-spray test after 240 hours respectively after 480 hours, measured as % face corrosion. All the corrosion tests with coatings having a certain content of chromate exhibit an excellent corrosion resistance. The chromate-free coatings that have a content of the zirconium carbonate have a very good corrosion resistance. Coatings of a low chromate content may have a reason for a less good corrosion test result, e.g. by a content of another neutralizing agent. It has now been found that the ionomeric materials are superior in corrosion resistance to other organic polymeric materials if there is a certain temperature as they have a melt release effect which closes the coating again after a defect has been generated in the coating. The wet stack test is performed according to a Chemetall internal standard. In the wet stack test, ten sheets coated on both sides without protection of the cut edges of 100 to 100 mm size are stacked after having put a drop of DI water of about 1 ml in the middle of every coated surface. This stack of coated sheets is totally wrapped in a polyethylene foil and is exposed over four weeks in a humidity cabinet which runs at 100% of humidity at 40° C.

The paint adhesion tests on the post-painted surfaces—the salt-spray test on the scribe and the cross hutch test before and after the humidity test according to DIN 50017 KK—are performed after painting the coated panels with a polyester based powder paint of about 50 μm coating thickness that was sintered at about 218° C. If the salt-spray test on the scribe shows 3 or 4 and if the cross hutch test after the humidity test shows GT1, the requirements of the appliance industry are well met. Nearly all coatings show a good paint adhesion.

Further on, it was found that the film-forming temperature is significantly lower than for the most other organic polymeric materials and that there may be a certain self-healing effect for defects and that a denser film may be generated than with the most other organic polymeric materials.

It has further been found that the addition of a UV absorbing agent reduces significantly the coloration of such organic coatings under sun light exposure (long-term outdoor exposure).

The coatings generated according to the invention show a relatively low permeability, are dense, of low affectability and of good homogeneity. They reach a relatively high cross-linking degree although there are not used any high temperature cross-linkers added as on the base e.g. of isocyanates.

The invention claimed is:

1. A process comprising
coating of surfaces of a metallic component having a metallic surface to be formed by at least one forming operation by contacting the metallic surface of the metallic component prior the forming operation with an aqueous composition that contains predominantly organic material, and contains at least one compound each of:
A) an organic film-forming polymeric material selected from the group consisting of an ionomeric copolymer or a copolymer chemically related to ionomeric copolymer having the properties of ionomeric copolymers or a corresponding monomer, comonomer, oligomer, cooligomer, polymer, blockcopolymer or an ester, salt or derivate thereof, which all together are constituents of at least 70% by weight of total organic polymeric material, wherein the total organic material has an average acid number in the range from 210 to 300; and
a cross-linking agent; and
water;
wherein the pH of the aqueous composition when applied is in the range from 6 to 10.5, wherein no wax or oil are added to the aqueous composition, wherein the aqueous composition or the ionomeric copolymer or copolymer chemically related to ionomeric copolymer for the aqueous composition or any combination of these are prepared by heating an aqueous copolymeric base composition containing at least one of the organic copolymers and at least one neutralizing agent to temperatures in the range from 50 to 150° C. for a time of at least half a minute, wherein the organic film-forming copolymer as constituent A) to be added to the aqueous composition is a material containing predominantly at least one member selected from the group consisting ethylene naphthalic anhydride copolymer and propylene naphthalic anhydride copolymer, and
forming the coated metallic component by at least one forming operation selected from the group consisting of cold-forming, cold-forging, roll-stamping, roll-forming, deep-drawing and wire-drawing.

2. A process comprising
coating of surfaces of a metallic component having a metallic surface to be formed by at least one forming operation by contacting the metallic surface of the metallic component prior the forming operation with an aqueous composition that comprises predominantly organic material, and contains at least one compound each of:
A) an organic film-forming polymeric material selected from the group consisting of an ionomeric copolymer or a copolymer chemically related to ionomeric copolymer having the properties of ionomeric copolymers or a corresponding monomer, comonomer, oligomer, cooligomer, polymer, blockcopolymer or an ester, salt or derivate thereof, which all together are constituents of at least 70% by weight of the total organic polymeric material; and
A') at least one further organic film-forming polymer or a corresponding monomer, oligomer, copolymer, blockcopolymer, derivate thereof or any combination thereof that do not belong to A) participating in the rest of the total organic polymeric material to 100% by weight;
B) a neutralizing agent;
C) a cross-linking agent; and
D) water;
wherein the pH of the aqueous composition when applied is in the range from 6 to 10.5, wherein no wax or oil is present in the coating; wherein the aqueous composition or the ionomeric copolymer or copolymer chemically related to ionomeric copolymer for the aqueous composition or any combination of these are prepared by heating an aqueous copolymeric base composition containing at least one of the organic copolymers and at least one neutralizing agent to temperatures in the range from 50 to 150° C. for at least 30 seconds, wherein the organic film forming copolymer is selected from the group consisting of ethylene naphthalic anhydride copolymer and propylene naphthalic anhydride copolymer, and wherein the total organic material has an average acid value of 210 to 300: and
forming the coated metallic component by at least one forming operation selected from the group consisting of cold-forming, cold-forging, roll-stamping, roll-forming, deep-drawing and wire-drawing; and
wherein no pretreatment layer is applied prior to the coating.

3. A process comprising
coating of surfaces of a metallic component having a metallic surface to be formed by at least one forming operation by contacting the metallic surface of the metallic component prior the forming operation with an aqueous composition that contains predominantly organic material, and contains at least one compound each of:
an organic film-forming polymeric material selected from the group consisting of an ionomeric copolymer or a copolymer chemically related to ionomeric copolymer having the properties of ionomeric copolymers or a corresponding monomer, comonomer, oligomer, cooligomer, polymer, blockcopolymer or an ester, salt or derivate thereof, which all together are constituents of at least 70% by weight of total organic polymeric material; and a cross-linking agent selected from the group of corrosion inhibiting cross-linking agents consisting of compounds of yttrium, titanium, hafnium, zirconium, zinc and a lanthanide containing compound; and water;

wherein the pH of the aqueous composition when applied is in the range from 6 to 10.5, wherein no wax or oil are added to the aqueous composition, wherein the aqueous composition or the ionomeric copolymer or copolymer chemically related to ionomeric copolymer for the aqueous composition or any combination of these are prepared by heating an aqueous copolymeric base composition containing the organic film forming polymeric material and at least one neutralizing agent to temperatures in the range from 50 to 150° C. for a time of at least half a minute, wherein the organic film-forming copolymer is a material containing predominantly ethylene/propylene naphthalic anhydride copolymers, and wherein the total organic material has an average acid value of 225 to 300; and forming the coated metallic component by at least one forming operation selected from the group consisting of cold-forming, cold-forging, roll-stamping, roll-forming, deep-drawing and wire-drawing.

4. A process comprising coating of surfaces of a metallic component having a metallic surface to be formed by at least one forming operation by contacting the metallic surface of the metallic component prior the forming operation with an aqueous composition that comprises predominantly organic material, and contains at least one compound each of:

A) an organic film-forming polymeric material selected from the group consisting of an ionomeric copolymer or a copolymer chemically related to ionomeric copolymer having the properties of ionomeric copolymers or a corresponding monomer, comonomer, oligomer, cooligomer, polymer, blockcopolymer or an ester, salt or derivate thereof, which all together are constituents of at least 70% by weight of total organic polymeric material; and A') at least one further organic film-forming polymer or a corresponding monomer, oligomer, copolymer, blockcopolymer, derivate thereof or any combination thereof that do not belong to A) participating in the rest of the total organic polymeric material to 100% by weight;

B) a neutralizing agent;

C) a cross-linking agent; and

D) water;

wherein the pH of the aqueous composition when applied is in the range from 6 to 10.5, wherein no wax or oil is present in the coating; wherein the aqueous composition or the ionomeric copolymer of copolymer chemically related to ionomeric copolymer for the aqueous composition or any combination of these are prepared by heating an aqueous copolymeric base composition containing at least one of the organic copolymers and at least one neutralizing agent to temperatures in the range from 50 to 150° C. for at least 30 seconds, wherein the organic film forming copolymer is selected from the group consisting of ethylene naphthalic anhydride copolymer and propylene naphthalic anhydride copolymer, wherein the cross-linking agent is zirconium carbonate, and wherein the total organic material has an average acid value of 210 to 300; and forming the coated metallic component by at least one forming operation selected from the group consisting of cold-forming, cold-forging, roll-stamping, roll-forming, deep-drawing and wire-drawing.

5. A process comprising coating of surfaces of a metallic component having a metallic surface to be formed by at least one forming operation by contacting the metallic surface of the metallic component prior the forming operation with an aqueous composition that contains predominantly organic material, and contains at least one compound each of:

an organic film-forming polymeric material selected from the group consisting of an ionomeric copolymer or a copolymer chemically related to ionomeric copolymer having the properties of ionomeric copolymers or a corresponding monomer, comonomer, oligomer, cooligomer, polymer, blockcopolymer or an ester, salt or derivate thereof, which all together are constituents of at least 70% by weight of the total organic polymeric material; and a cross-linking agent selected from the group of corrosion inhibiting cross-linking agents consisting of compounds of yttrium, titanium, hafnium, zirconium, zinc and a lanthanide containing compound; and water;

wherein the pH of the aqueous composition when applied is in the range from 6 to 10.5, wherein no wax or oil are added to the aqueous composition, wherein the aqueous composition or the ionomeric copolymer or copolymer chemically related to ionomeric copolymer for the aqueous composition or any combination of these are prepared by heating an aqueous copolymeric base composition containing at least one of the organic copolymers and at least one neutralizing agent to temperatures in the range from 50 to 150° C. for a time of at least half a minute, wherein the organic film-forming copolymer is a material containing predominantly ethylene/propylene naphthalic anhydride copolymers, wherein the cross-linking agent is zirconium carbonate, and wherein the total organic material has an average acid value of 210 to 300; and forming the coated metallic component by at least one forming operation selected from the group consisting of cold-forming, cold-forging, roll-stamping, roll-forming, deep-drawing and wire-drawing.

* * * * *